Dec. 4, 1956 P. RICHARDSON 2,773,208
RING WINDING FOR ELECTRICAL MACHINES
Filed Jan. 6, 1954

Philip Richardson
By Sawyer & Kennedy
Attys

United States Patent Office 2,773,208
Patented Dec. 4, 1956

2,773,208

RING WINDING FOR ELECTRICAL MACHINES

Philip Richardson, Newcastle-upon-Tyne, England, assignor to C. A. Parsons & Company Limited, Newcastle-upon-Tyne, England Application January 6, 1954, Serial No. 402,444

Claims priority, application Great Britain January 13, 1953

2 Claims. (Cl. 310—202)

This invention relates to an improved use of ring windings for polyphase electrical machines and more particularly of rotating polyphase electrical machines. Hitherto the windings of such machines have been normally embedded in slots around the periphery of the element concerned and the form of winding has remained substantially unchanged for many years, being characterised by the manner in which coil sides, or conductors forming part of a coil, are arranged to be associated with poles of opposite polarity and joined by end winding connections at each end of the coil sides.

This arrangement is well recognised with those acquainted with the art.

In the case of a polyphase ring winding on the stationary element of a dynamo electric machine referred to as the stator in which the inner periphery relates to that nearest the air gap and the outer periphery is that remote from the air gap, the ring winding conductors are normally arranged around the stator bore and are connected to conductors arranged around the outer periphery of the stator by substantially radial connections.

The conductors around the inner periphery are active conductors and those around the outer periphery are non-active.

In practice there are a number of objections to the use of such a winding due to the flux associated with the conductors around the outer periphery which in addition to causing additional losses in the adjoining parts may also adversely affect the machine reactance. The use of squirrel cage damping windings to minimise the effect of such fluxes has been previously proposed.

The object of the present invention is to provide improved forms of polyphase ring windings wherein the resultant external field is minimised.

The present invention comprises a ring winding for a polyphase electrical machine embodying features as set forth in the claims appended hereto.

Referring to the accompanying diagrammatic drawings.

Figure 1:
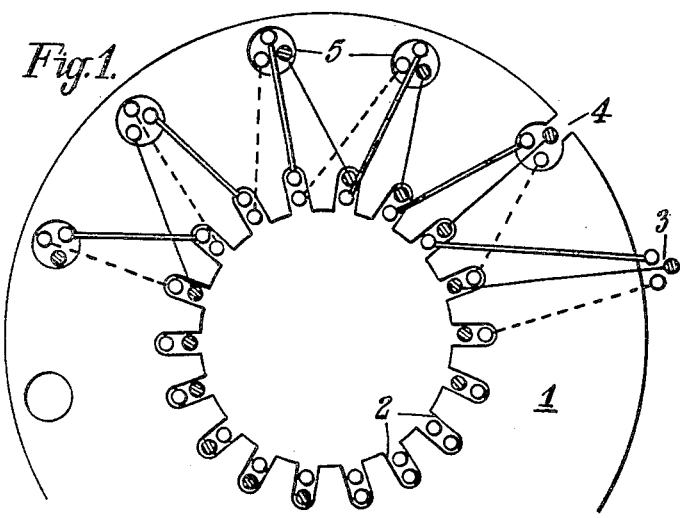
Figure 1 represents part of the stator of a 3-phase dynamo electric machine embodying the present invention.

In carrying the invention into effect according to one form by way of example as applied to a two-pole, three-phase dynamo electric machine showing the stator core 1 in which the slots 2 around the stator bore contain the active conductors, which for convenience are shown in Figure 1 as two conductors per slot, and while the winding is shown as a short pitched winding the equivalent winding pitch may be decided in accordance with recognised practice.

Figure 2:
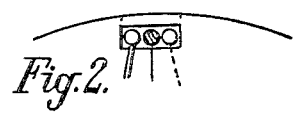
Figures 2, 3, 4 and 5 illustrate four alternative arrangements of the non-active outer conductors of Figure 1.
Figure 4:
Figure 3:
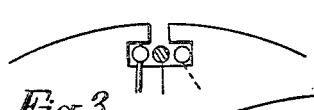
Figure 5:
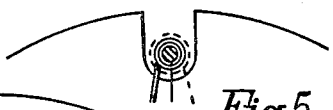

The groups of non-active conductors containing an equal number of ampere conductors of each phase are shown at the outer periphery and may be grouped external to the stator core as at 3, partially within the stator core as at 4, or wholly within the stator core as at 5. The manner of grouping the non-active conductors of each phase is not important provided they are so physically related that their resultant field is minimised and they may, for example, be arranged contiguously as in Figures 2 or 3, or concentrically as in Figures 4 and 5. The number of groups of non-active conductors around the outer periphery may be varied in relation to the number of active slots around the inner periphery by grouping or subdividing the active conductors in a suitable manner.

Figure 6:
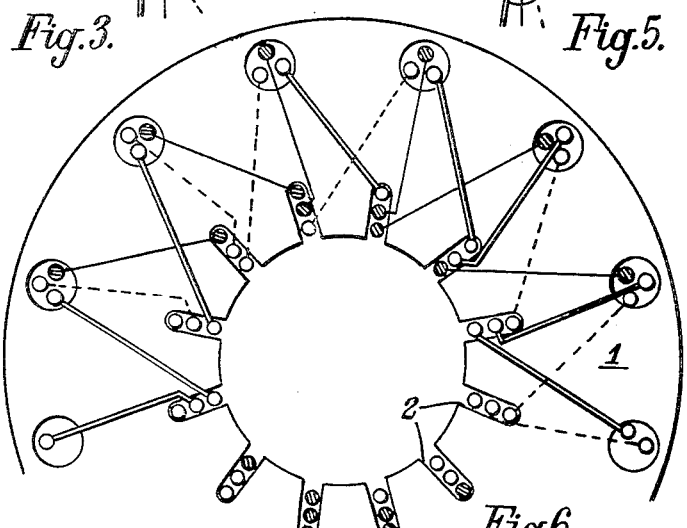
Figure 6 illustrates part of a 3-phase stator embodying a modified arrangement of the slots and windings.

An alternative arrangement is shown in Figure 6 where the number of active conductors or coil sides per slot is increased to three and the ratio of slots around the inner and outer periphery is different from that illustrated in Figure 1.

The connections or groups of connections of each phase can be mutually arranged in such a manner as to minimise the end leakage field resulting from the current flowing in the end connections of a stator.

An advantage of windings embodying the present invention is that machines embodying such windings may possess an enhanced efficiency due to the reduction of eddy current losses around the outer periphery of the stator core and at either end of the stator, thus facilitating the design of machines having high specific ratings.

Furthermore, it will be clear to those skilled in the art that, particularly where the non-active conductors or groups of conductors belonging to each phase are wholly or partially embedded in slots around the outer periphery of the stator, when the current in each phase is no longer equal, the external field attains a specific value depending upon the extent of the current unbalance of the three phases. The path available for the flux can be predetermined, thus enabling the designer to modify the relation between the various machine reactances and in particular the negative sequence component of reactance may be increased beyond the values associated with the hitherto known forms of winding.

One important advantage of an increase in the negative sequence reactance of a synchronous dynamoelectric machine is that the negative sequence component of current which flows for example during a given single phase or two phase fault condition is proportionately reduced and the heating of the rotor due to eddy currents induced by the negative sequence field is consequently reduced.

Windings embodying the present invention are also of advantage for any three-phase element such as the stator and/or rotor of a synchronous or asynchronous dynamo electric machine, and has a particular application to designs having a large pole pitch compared with the core length where the reactance of the end winding connectors has a predominating effect upon the performance characteristics.

I claim:

1. A ring winding for a polyphase electrical machine containing 3 phases wherein the conductors around the periphery remote from the air gap are arranged in groups containing an equal number of ampere conductors from each phase.

2. A ring winding for a polyphase electrical machine containing a multiple of 3 phases wherein the conductors around the periphery remote from the air gap are arranged in groups containing an equal number of ampere conductors from each phase.

References Cited in the file of this patent

UNITED STATES PATENTS 1,183,286   Farny ------------------ May 16, 1916

FOREIGN PATENTS 365,560   Great Britain ----------- Jan. 15, 1932